(12) United States Patent
Schootstra et al.

(10) Patent No.: US 9,254,919 B2
(45) Date of Patent: Feb. 9, 2016

(54) HANGING GALLEY INSERT WITH STOWABLE DOOR AND GALLEY INCLUDING A HANGING GALLEY INSERT

(71) Applicant: B/E AEROSPACE, INC., Wellington, FL (US)

(72) Inventors: Siebe Schootstra, Culemborg (NL); Nicolaas Johannes van Zwieten, Ravenswaaij (NL); Martijn Klok, Rijswijk (NL); Marcus Michael Cornelis Jaspers, Woerden (NL); Aaron Hawkins, Seattle, WA (US); Eid-Beng Goh, Seattle, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 145 days.

(21) Appl. No.: 13/852,983

(22) Filed: Mar. 28, 2013

(65) Prior Publication Data

US 2013/0255656 A1 Oct. 3, 2013

Related U.S. Application Data

(60) Provisional application No. 61/616,780, filed on Mar. 28, 2012.

(51) Int. Cl.
*F24C 15/02* (2006.01)
*B64D 11/04* (2006.01)

(52) U.S. Cl.
CPC .............. *B64D 11/04* (2013.01); *F24C 15/026* (2013.01)

(58) Field of Classification Search
CPC .......... F24C 15/02; F24C 15/22; F24C 15/23; F24C 15/26; F24C 15/27; F24C 15/28; F24C 15/08; F24C 15/108; F24C 15/12; F24C 15/30; B64D 11/04; B64D 11/0007; A47J 2201/00; A47J 2201/34; F24B 1/207
USPC ......... 126/9 R, 19 M, 24, 39 B, 50, 190–200; 244/118.5, 118.1; 219/756, 521
See application file for complete search history.

(56) References Cited

U.S. PATENT DOCUMENTS 3,064,554 A * 11/1962 Lamb .............................. 99/337
3,127,889 A 4/1964 Mills (Continued)

FOREIGN PATENT DOCUMENTS

DE 29717483 U1 * 12/1997 .............. F24C 15/02
WO 2010/142420 A1 12/2010

OTHER PUBLICATIONS

Photographs of "Steam Oven DS7000 LH Series," 2001, 1 page, B/E Aerospace, Inc., Wellington, FL.

(Continued)

*Primary Examiner* — Gregory Huson
*Assistant Examiner* — Nikhil Mashruwala
(74) *Attorney, Agent, or Firm* — Drinker Biddle & Reath LLP

(57) ABSTRACT

A galley for heating food with improved access to galley work areas includes: a partially enclosed galley area having a top galley structure and a work deck in the galley area; and galley insert having a housing and a top mounting element disposed on top of the housing, the galley insert being attached to the top galley structure at the top mounting element, and located above and spaced from the work deck.

15 Claims, 4 Drawing Sheets

(56) References Cited

U.S. PATENT DOCUMENTS

| | | | |
|---|---|---|---|
| 4,453,690 A | 6/1984 | Takeuji | |
| 4,580,853 A * | 4/1986 | Hitzeroth et al. | 312/245 |
| 4,628,185 A | 12/1986 | Norwood et al. | |
| 4,726,352 A * | 2/1988 | Radke | 126/190 |
| 7,565,903 B2 * | 7/2009 | Sasaki et al. | 126/24 |
| 8,319,160 B2 * | 11/2012 | Koschberg et al. | 219/621 |
| 8,814,087 B2 | 8/2014 | Koschberg et al. | |
| 8,944,376 B2 * | 2/2015 | Godecker et al. | 244/118.5 |
| 2006/0145002 A1 * | 7/2006 | Van Loon | 244/118.1 |
| 2006/0289530 A1 | 12/2006 | Cordae | |
| 2008/0001031 A1 * | 1/2008 | Doebertin et al. | 244/118.1 |
| 2009/0314889 A1 | 12/2009 | Baatz et al. | |
| 2013/0247590 A1 * | 9/2013 | Lu et al. | 62/3.6 |

OTHER PUBLICATIONS

Search report and written opinion issued in related application PCT/US2013/034498, Jun. 28, 2013, 10 pages.

Supplementary partial European search report and opinion issued in related application EP 13768228.2, Oct. 26, 2015, 6 pages.

* cited by examiner

HANGING GALLEY INSERT WITH STOWABLE DOOR AND GALLEY INCLUDING A HANGING GALLEY INSERT

CROSS-REFERENCE TO RELATED APPLICATION

This application claims the priority benefit of U.S. Provisional Patent Application No. 61/616,780 entitled "HANGING OVEN WITH STOWABLE DOOR AND GALLEY CONFIGURATION INCLUDING A HANGING OVEN" and filed on Mar. 28, 2012, which is hereby incorporated herein by reference in its entirety.

BACKGROUND

1. Field

Embodiments relate to a galley insert, such as an oven for heating food, and more specifically to a hanging galley insert with a stowable door and a vehicle galley including a hanging galley insert.

2. Related Art

There are prior ovens for use in a galley of a vehicle, for instance, an aircraft. These ovens normally stand on a galley work deck in a separate compartment or cavity. Typically, the bottom and lower back of the ovens are mounted to the galley work deck to secure the ovens to the galley. The doors of the ovens open outward and protrude into the galley workspace when users are attempting to place food into or retrieve food from the ovens. As a result, users operating the prior ovens incur significant risk of being burned by the protruding hot oven doors.

Prior ovens that stand in a separate galley compartment can be very cumbersome for several reasons. Galleys typically are partially enclosed and have limited work areas available. The prior ovens occupy valuable space in the galley work area and on the galley work deck, which reduces the amount of space available on the galley work deck and in the galley work area for other uses. In addition, the separate compartments or cabinets used to house the ovens add additional weight to the galley structure.

SUMMARY

Embodiments herein may overcome problems of prior ovens to facilitate more space on the galley work deck and in the galley work area. Various embodiments may further help reduce the risk of burns a user may incur from touching a protruding hot oven door.

One advantage of a galley insert according to an embodiment is the capability of the galley insert to be hung from a galley structure above the work deck. Furthermore, the galley insert includes a stowable door that minimizes the amount of space the galley insert occupies in the galley work area when the door is opened. In an embodiment, an oven hangs from the galley structure above the work deck and includes a door that is operable to slide or stow below the oven. In this configuration, the oven does not use any galley work deck space, and the oven door is stowed below the oven so the door does not protrude into the galley work area. Because the oven door may be stowed below the oven when the oven door is hot, a user's risk of incurring burns from touching an open hot oven door is substantially reduced.

In various embodiments, a galley insert is attached to a top galley structure above the galley insert, for example, a shelf, a cabinet, a partially enclosed cavity, or other galley structure known in the art. The galley insert may be attached to the top galley structure using various mounting elements that are disposed on the housing of the galley insert. The top of the housing may be attached to the top galley structure, such that the galley insert is fully supported by the top galley structure above the galley insert and the work deck. Furthermore, the galley insert may be partly supported by a back galley structure behind the galley insert, such as a galley wall, through the use of support elements or mounting elements that are disposed on the back of the housing. Alternatively, the galley insert may be mounted to the back galley structure in addition to or instead of the top galley structure. The mounting elements disposed on the housing may include rails, slots, bolt connectors, ARINC (Aeronautical Radio, Inc.) pins, or other mounting elements known in the art. Furthermore, the hanging galley insert may be a line replaceable unit (LRU) that may be readily removed from the top galley structure and replaced in the field due to failure or for maintenance.

In an embodiment, a galley for preparing food with improved access to galley work areas includes a partially enclosed galley area having a top galley structure and a work deck in the galley area, and a galley insert having a housing and a top mounting element disposed on top of the housing, the galley insert being attached to the top galley structure at the top mounting element, and located above and spaced from the work deck.

The galley may be an aircraft galley. The top galley structure may include a partially enclosed cavity, and the galley insert may be attached to a top of the partially enclosed cavity at the top mounting element. The galley insert may include an apparatus selected from the group consisting of an oven, a beverage center, a refrigerator, and a freezer.

The galley area may further include a back galley structure disposed behind the housing, and the galley insert may further include a back support element disposed on a back of the housing to support the housing at the back galley structure. The back support element may include an ARINC pin. Alternatively, the galley insert may be attached to the back galley structure instead of the top galley structure.

The housing of the galley insert may further include a stowable front door and a slidable door mounting mechanism at a bottom of the housing, the stowable door being hingeably coupled to the door mounting mechanism, and a door support element at the bottom of the housing for receiving the door when it is stowed below the housing. The door mounting mechanism may further include a rail disposed on the bottom of the housing generally perpendicularly to a front of the housing, and a coupling hingeably affixed to a bottom edge of the stowable door slidably mounted to the rail. The door support element may further include a bracket running generally perpendicularly to the front of the housing, having a lip spaced from the bottom of the housing to support the stowable door when it is stowed below the housing.

In another embodiment, a galley for preparing food with improved access to galley work areas includes a partially enclosed cavity having a top and a bottom, and a galley insert having a housing and a top mounting element disposed on top of the housing, the galley insert being attached to the top of the partially enclosed cavity at the top mounting element, and located above and spaced from the bottom of the partially enclosed cavity.

The galley may be an aircraft galley. The partially enclosed cavity may be disposed at a top of the galley.

The partially enclosed cavity may further include a back surface, and the galley insert may further include a back support element disposed on a back of the housing to support the housing at the back surface of the partially enclosed cavity. The back support element may include an ARINC pin.

Alternatively, the galley insert may be attached to the back surface instead of the top of the partially enclosed cavity.

In yet another embodiment, an oven for installation and use in a partially enclosed galley work area having a top galley structure and a work deck includes an oven housing having a heating element and a top, and a top mounting element disposed on the top of the housing for attaching the oven to the top galley structure. The oven may further include a back support element disposed on a back of the housing for supporting the oven at a back galley structure in the galley work area. Alternatively, the oven may include a back support element disposed on a back of the housing for attaching the oven to a back galley structure in the galley work area instead of the top support element.

While the exemplary embodiments described herein are presented in the context of a hanging oven in a galley, these embodiments are exemplary only and are not to be considered limiting. The embodiments of the apparatus and configuration are not limited to hanging ovens. For example, embodiments of the apparatus and configuration may be adapted for a refrigerator, freezer, beverage center, and other food storage and preparation devices. As another example, embodiments of the apparatus and configuration may be adapted to fit within other sizes of under-utilized areas in a vehicle galley.

BRIEF DESCRIPTION OF THE DRAWINGS

The above and other features and advantages of the invention will become more apparent by describing in detail exemplary embodiments thereof with reference to the attached drawings listed below.

DETAILED DESCRIPTION

In various embodiments, a galley insert may be hung from a top galley structure above a work deck in a galley work area. The galley insert may be attached to the top galley structure using various mounting elements that are disposed on the housing of the galley insert. The top of the housing may be attached to the top galley structure, such that the galley insert is fully supported by the top galley structure above the galley insert and the work deck. Furthermore, the galley insert may be partly supported by a back galley structure behind the galley insert, such as a galley wall, through the use of support elements or mounting elements that are disposed on the back of the housing. Alternatively, the galley insert may be mounted to the back galley structure in addition to or instead of the top galley structure. The mounting elements disposed on the housing may include rails, slots, bolt connectors, ARINC (Aeronautical Radio, Inc.) pins, or other mounting elements known in the art. Furthermore, the hanging galley insert may be a line replaceable unit (LRU) that may be readily removed from the top galley structure and replaced in the field due to failure or for maintenance.

A galley insert may include an oven, a beverage center, a refrigerator, a freezer. An oven may include a convection oven, an electric oven, a microwave oven, or other ovens known in the art. A beverage center may include a coffee maker, an espresso maker, a hot water heater (e.g., a hot water kettle, pot, or pan), or other beverage makers known in the art. While the following exemplary embodiments are presented in the context of a hanging oven in a galley, these embodiments are exemplary only and are not to be considered limiting. Embodiments of the apparatus and configuration may be adapted for any galley insert for use in a vehicle galley.

Figure 1A:
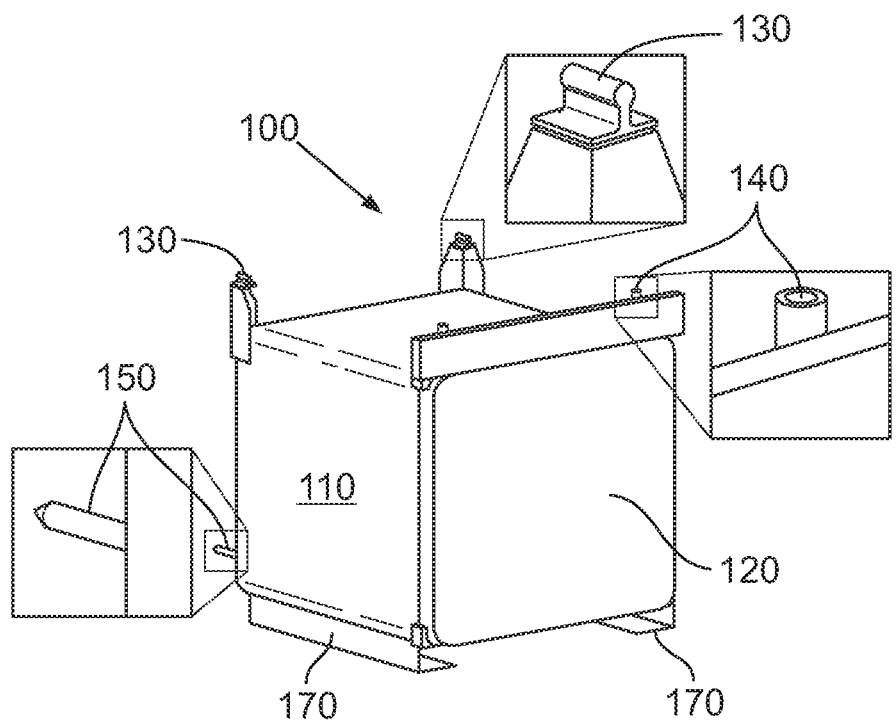
FIG. 1A is a perspective view and FIG. 1B is a front elevation view illustrating an oven for installation and use in a partially enclosed galley work area, according to an embodiment.
Figure 1B:
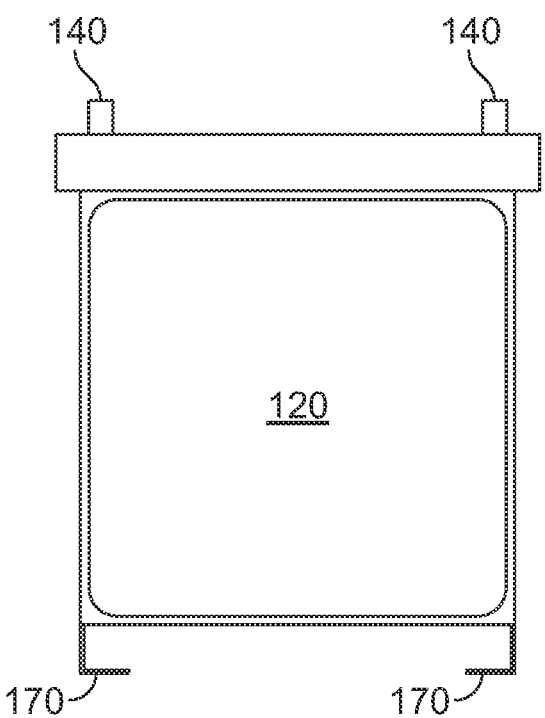

FIG. 1A is a perspective view and FIG. 1B is a front elevation view illustrating a hanging oven 100 for installation and use in a partially enclosed galley work area, according to an embodiment. An oven 100 may be installed and used in a partially enclosed galley work area having a top galley structure and a work deck. The oven includes a housing 110 having a heating element and a top, and a top mounting element disposed on the top of the housing 110 for attaching the oven 100 to the top galley structure.

The heating element (not shown) may be, for example, an electric heating element, a thermo-electric Peltier device, or other standard heating elements known in the art. The top mounting element may include, for example, slots 130 and bolted connectors 140 disposed on the top of the housing 110 as shown in FIG. 1A. The slots 130 and bolted connectors 140 may be used to fixedly attach the oven 100 to the top galley structure located above the oven 100. Accordingly, the weight of the oven 100 is fully supported by the top galley structure.

In other embodiments (see e.g., FIGS. 4A and 4B), the galley area may further include a back galley structure disposed behind the housing 110, and the oven 100 may further include a back support element disposed on a back of the housing 110 to support the housing 110 at the back galley structure. As illustrated in FIG. 1A, the back support element may include ARINC pins 150 disposed on the back of the oven housing 110. The ARINC pins 150 may passively rest against or be fixedly attached to a galley wall behind the oven 100 to provide additional support. Alternatively, the oven 100 may be attached to the back galley structure instead of the top galley structure. Although slots 130, bolted connectors 140, and ARINC pins 150 are shown in the current embodiment, this should not be construed as limiting. The mounting elements disposed on the oven housing 110 may include nails, screws, pins, rails, or other mounting elements known in the art.

As shown in FIG. 1A, the housing 110 has a top, a bottom, and a front opening. A door mounting mechanism 160 (FIG. 2) is slidably attached to the bottom of the housing 110. A stowable oven door 120 sized to cover the front opening of the housing 110 is hingeably coupled to the door mounting mechanism 160. Furthermore, a door support element is attached to the bottom of the housing 110 for receiving the oven door 120 when it is stowed below the housing 110. In an embodiment, the door support element includes dual brackets 170 that run along a bottom edge of the housing 110. The dual brackets 170 may be installed on opposite sides of the bottom of housing 110. However, a single bracket could be used.

Figure 5:
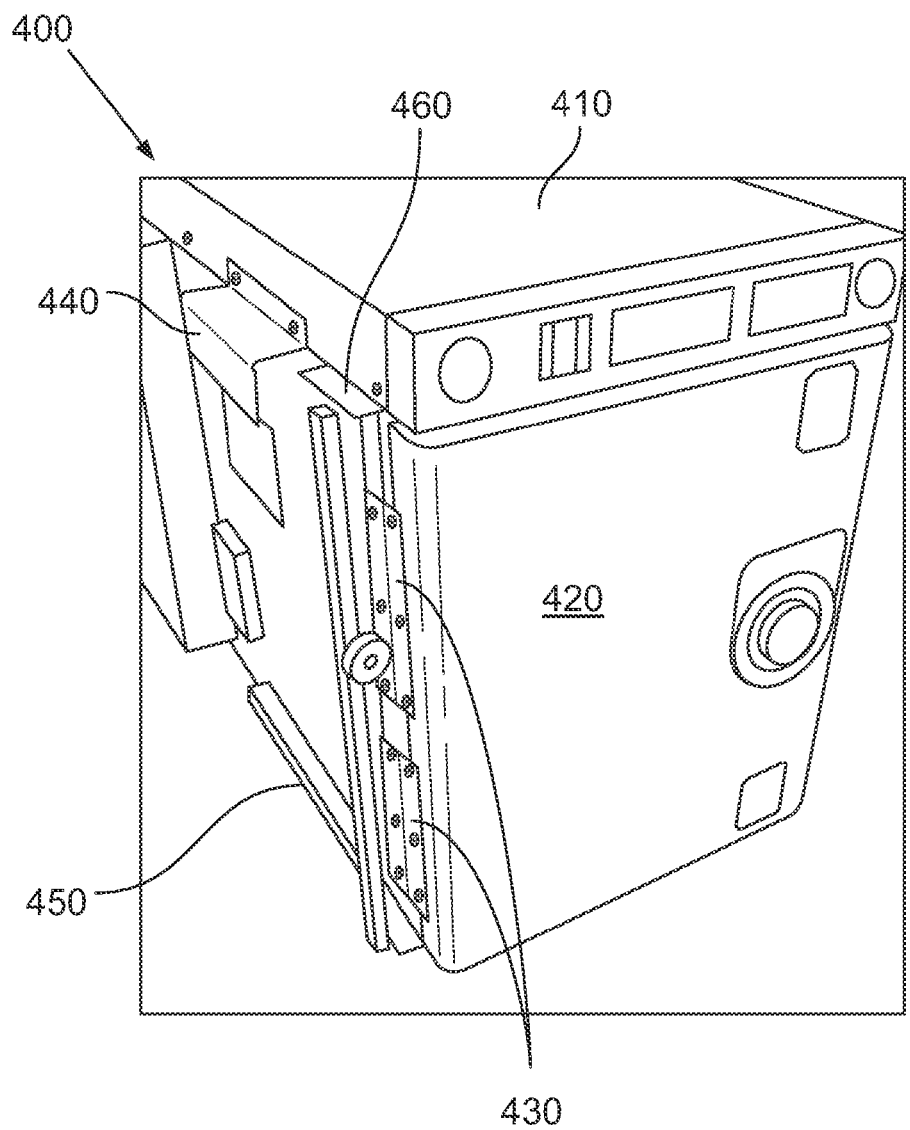
FIG. 5 is a perspective view illustrating a conventional oven with a door that is slidable to the side of the conventional oven.

The stowable oven door 120 is hingeably coupled to a door mounting mechanism 160 (FIG. 2) slidably attached to the bottom of the housing 110. The door mounting mechanism may be similar to a slidable mechanism shown in FIG. 5. FIG. 5 is a perspective view illustrating a conventional oven 400 with a door 420 that is slidable along the side of a conventional oven 400. The conventional oven 400 stands on a galley work deck in a separate compartment or cavity. The bottom and lower back of the prior art oven 400 is mounted to the galley work deck to secure it to the galley. The conventional oven 400 includes a housing 410 and a door 420. Although not shown in FIG. 5, the bottom and lower back of the housing 410 are mounted to the galley work deck. Rails 450 are disposed on the side of the housing 410, and a slidable mechanism 460 is attached to the rails 450. The slidable mechanism 460 includes hinges 430 that couple the door 420 to the slidable mechanism 460. The conventional oven 400 also includes a bracket 440 that is disposed toward the top edge of the side of the housing 410 to hold the door 420 against the housing 410 when the door 420 is opened and slid to the side of the housing 410.

Figure 2:
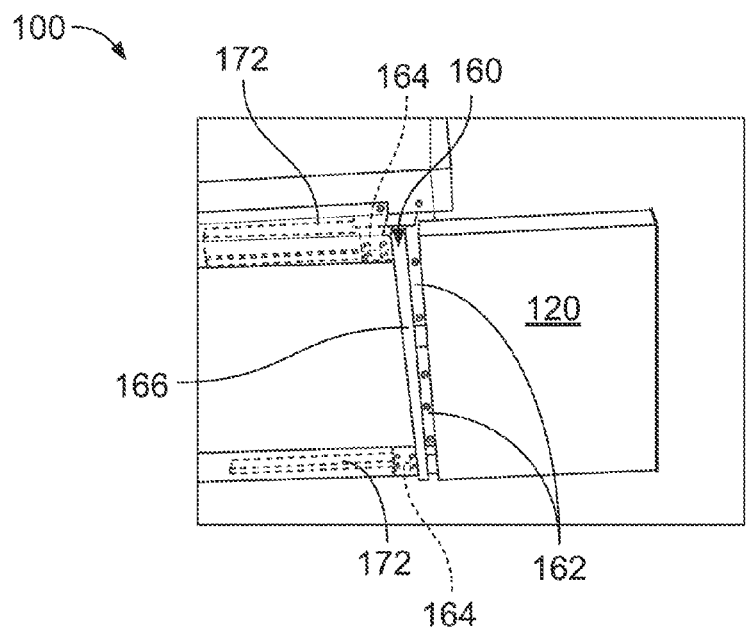
FIG. 2 is a partial bottom perspective view illustrating an oven for installation and use in a partially enclosed galley work area, according to another embodiment.

FIG. 2 is a partial bottom perspective view illustrating the oven 100 for installation and use in a partially enclosed galley work area 200 (FIGS. 4A and 4B), according to another embodiment. In FIG. 2, the stowable door 120 is opened and parallel with the bottom of the oven housing 110. The stowable oven door 120 is hingeably coupled to a door mounting mechanism 160 slidably attached to the bottom of the housing 110. The door mounting mechanism 160 includes hinges 162, dual rails 164, and a coupling 166. The dual rails 164 are disposed on the bottom of the housing 110 generally perpendicularly to the front of the housing 110. The coupling 166 is hingeably affixed to a bottom edge of the stowable door 120 via hinges 162 and is slidably mounted to the dual rails 164. The coupling 166 may include a slider and may further include rollers or wheels to slide on the dual rails 164. The dual rails 164 may be substantially parallel to each other.

FIG. 2 shows the oven 100 with dual brackets 172 as the door support element. The dual brackets 172 run generally perpendicularly to the front of the housing 110, and each of the dual brackets 172 has a lip spaced from the bottom of the housing 110 to support the stowable door 120 when it is stowed below the housing 110. The dual brackets 172 may be installed on opposite sides of the bottom of housing 110. The dual brackets 172 illustrated in FIG. 2 are shorter than the dual brackets 170 illustrated in FIG. 1A.

In other embodiments, the door mounting mechanism 160 of the oven 100 may include a rail disposed on the bottom of the housing 110 perpendicularly to the front of the housing 110, and a coupling hingeably affixed to a bottom edge of the stowable door 120 slidably mounted to the rail. Furthermore, the door support element may include a bracket running generally perpendicularly to the front of the housing 110, having a lip spaced from the bottom of the housing 110 to support the stowable door 120 when it is stowed below the housing 110.

Figure 3A:
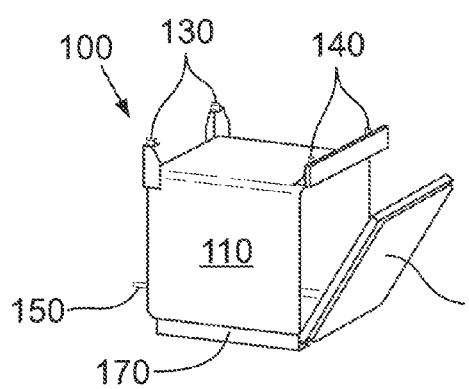
FIGS. 3A-3D are perspective views illustrating the door of the oven of FIG. 1 being stowed, according to an embodiment.
Figure 3B:
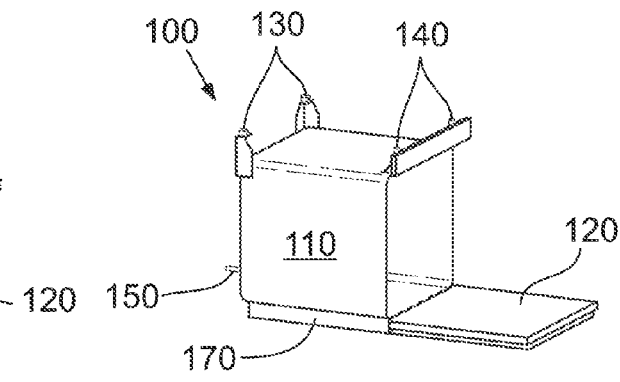
Figure 3C:
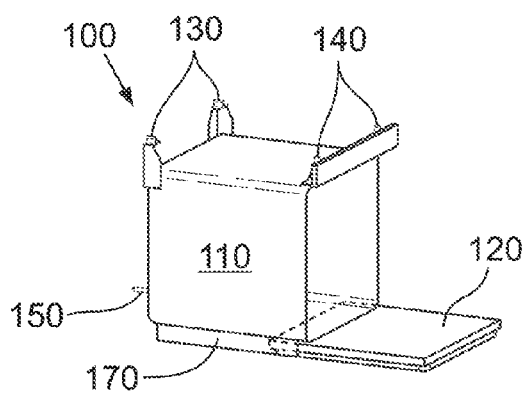
Figure 3D:
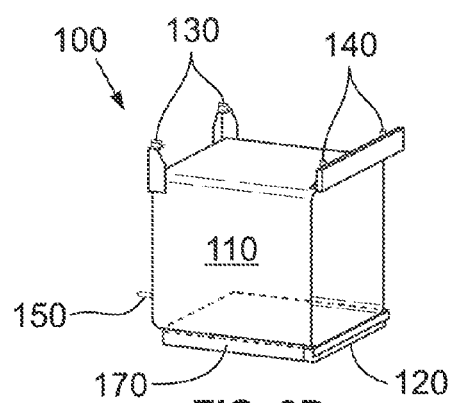

FIGS. 3A-3D are perspective views illustrating the door 120 of the oven 100 of FIG. 1 being stowed, according to an embodiment. In FIG. 3A, the oven door 120 is lowered to a partially opened position. In FIG. 3B, the oven door 120 is opened completely, so that the door 120 is parallel with the bottom of the oven housing 110. The front opening of the housing 110 is completely exposed so a user may place food into the oven 100 or retrieve heated food from the oven 100. In FIG. 3C, the oven door 120 is slid toward the back of the oven 100 along the bottom of the oven housing 110 via the door mounting mechanism, such as the door mounting mechanism 160 shown in FIG. 2. A door support element including the dual brackets 170 may be disposed on the bottom of the oven housing 110 to hold the oven door 120 securely against the oven housing 110 while the oven door 120 is stowed. FIG. 3D illustrates the oven 100 with the oven door 120 completely stowed under the oven housing 110.

Furthermore, the oven door 120 may be stowed and locked in any position between the completely opened position as shown in FIG. 3B and the completely stowed position as shown in FIG. 3D.

The oven 100 is particularly well-suited for mounting in a vehicle galley, such as an aircraft galley. The galley may include a partially enclosed galley work area, which is enclosed on multiple sides with one side open as an entrance/exit way. Such galley work areas might be found in aircrafts, ships, boats, campers, food trucks, and other motor vehicles with kitchen facilities. The galley may include shelves, cabinets, partially enclosed cavities or compartments, work decks, and other components for storage and preparation of food and beverage. Accordingly, the work areas in the galley and access to these work areas may be extremely limited.

Figure 4A:
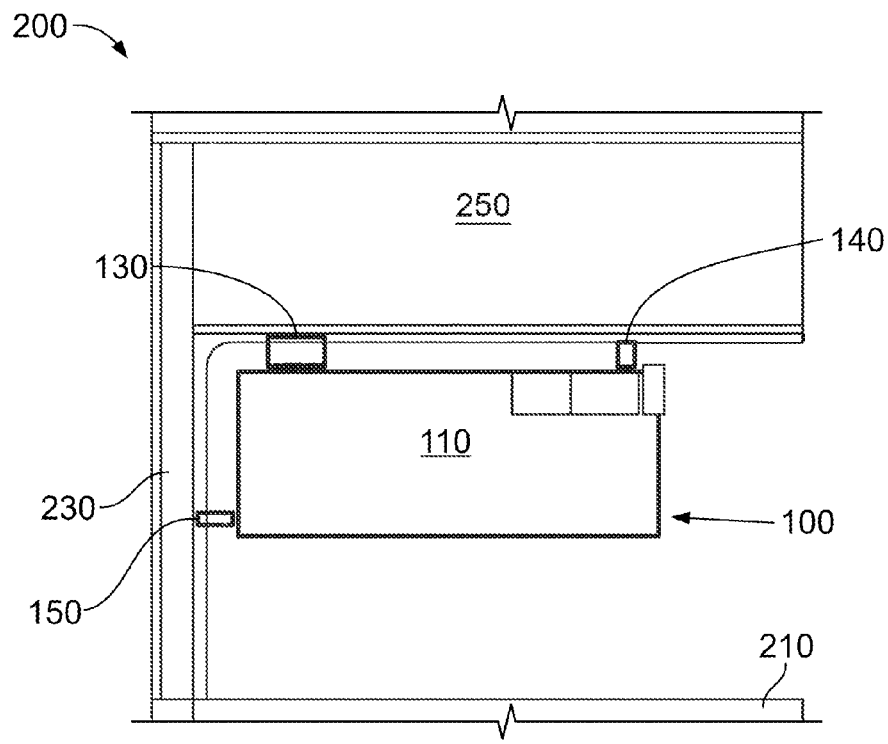
FIG. 4A is a side view and FIG. 4B is a top view illustrating a galley work area with an oven attached to a top galley structure and spaced from a work deck, according to an embodiment.
Figure 4B:
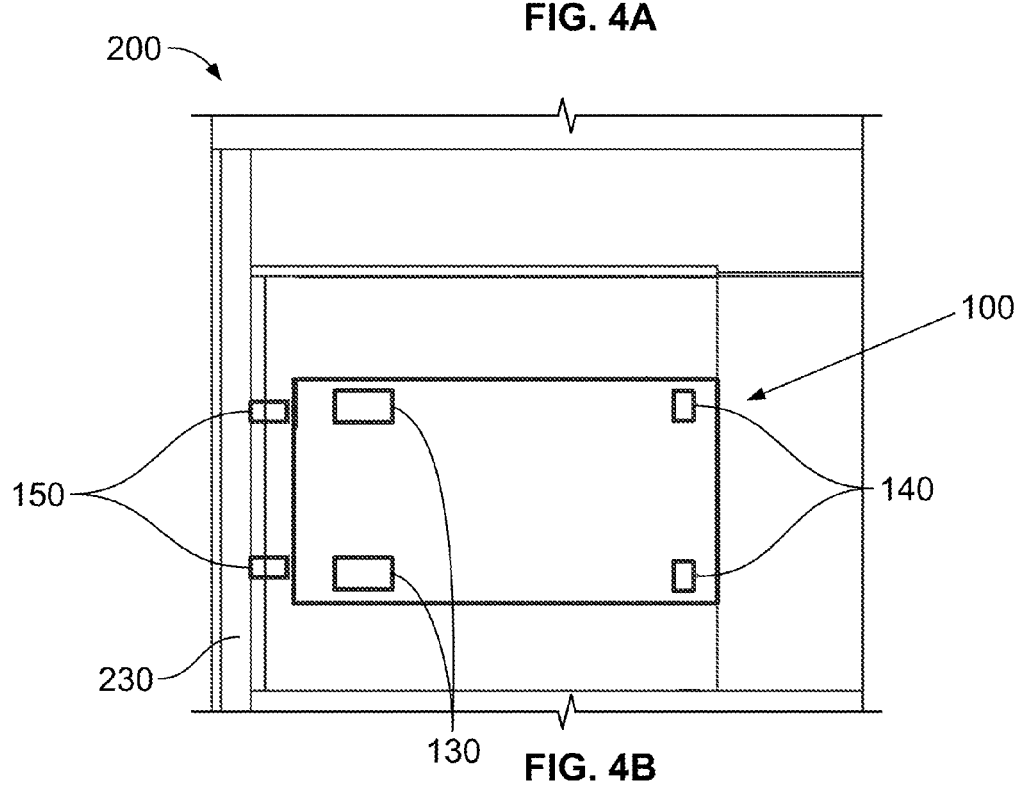

FIG. 4A is a side view and FIG. 4B is a top view illustrating a galley work area 200 with a hanging oven 100 attached to a top galley structure 250 and spaced from a work deck 210, according to an embodiment. In FIG. 4A, the partially enclosed galley area 200 includes a top galley structure 250 and a work deck 210 in the galley area 200. The oven 100 has a housing 110 and a top mounting element disposed on top of the housing 110. The oven 100 is attached to the top galley structure 250 at the top mounting element, and the oven is located above and spaced from the work deck 210.

The oven 100 may be attached to the top galley structure 250 using various mounting elements that are disposed on the oven housing 110. For example, as shown in FIG. 4A, the oven 100 is attached to the top galley structure 250 using slots 130 and bolted connectors 140. The weight of the oven 100 is fully supported by the top galley structure 250. The top galley structure 250 may include a shelf, a cabinet, or a partially enclosed cavity or compartment. The oven 100 may be attached to the bottom of a galley shelf or cabinet so that the oven 100 hangs from the galley shelf or cabinet. The oven 100 may also be attached to a top of the partially enclosed cavity so that the oven 100 so that the oven 100 hangs inside the partially enclosed cavity.

As shown in FIG. 4A, the galley work area 200 may further include a back galley structure, such as the back galley wall 230. The oven 100 may be partly supported by the back galley wall 230 behind the oven 100 through the use of a back support element that is disposed on the back of the oven housing 110. The back support element may include ARINC pins 150. Alternatively, the oven 100 may be mounted to the back galley wall 230 in addition to or instead of being mounted to the top galley structure 250. The mounting elements disposed on the oven housing may include rails, slots, bolted connectors, or other mounting elements known in the art.

In addition, the oven 100 is located above and spaced from the galley work deck 210 so a user can easily access the oven 100 and the work deck 210. The space below the oven 100 and the work deck 210 is also available for the user to perform various tasks.

In various embodiments, the oven housing 110 may further include a stowable front door 120 and a slidable door mounting mechanism at a bottom of the housing 110, the stowable door 120 being hingeably coupled to the door mounting mechanism, and a door support element at the bottom of the housing 110 for receiving the door 120 when it is stowed below the housing 110. The door 120 of the hanging oven 100 may be stowed or slid completely below the oven 100 so that the door 120 does not protrude into the galley work area 200. Moreover, since the inner surface of the oven door 120 may be hot, stowing the door 120 under the oven 100 will reduce the user's risk of being burned when the oven door 120 is open.

In FIG. 4B, the oven 100 is attached to the top galley structure 250 via slots 130 and bolted connectors 140 disposed on top of the oven 100 so that the oven 100 does not slide or move sideways, in this embodiment. In addition, the oven 100 may rest against or be secured to the back galley structure 230 using ARINC pins 150. The hanging oven 100 may be a line replaceable unit (LRU) that may be readily removed or detached from the top galley structure 250 or the back galley structure 230 and replaced in the field due to failure or for maintenance.

In another embodiment, a galley for heating food with improved access to galley work areas includes a partially enclosed cavity having a top and a bottom and an oven 100 having a housing 110 and a top mounting element (e.g., slots 130 and bolted connectors 140) disposed on top of the housing 110, the oven 110 being attached to the top of the partially enclosed cavity at the top mounting element, and located above and spaced from the bottom of the partially enclosed cavity.

The partially enclosed cavity may be disposed at a top of the galley. The partially enclosed cavity may further include a back surface, and the oven 100 may further includes a back support element 150 disposed on a back of the housing 110 to support the housing at the back surface of the partially enclosed cavity. The back support element may include an ARINC pin 150. Alternatively, the oven 100 may be attached to the back surface instead of the top of the partially enclosed cavity.

While the exemplary embodiments described herein are presented in the context of a hanging oven fixedly attached to an aircraft galley structure above, these embodiments are exemplary only and are not to be considered limiting. The embodiments of the apparatus and configuration are not limited to hanging ovens. For example, embodiments of the apparatus and configuration may be adapted for a refrigerator, freezer, and other food storage and cooking devices. As another example, embodiments of the apparatus and configuration may be adapted to fit within other sizes of under-utilized areas in an aircraft galley.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A galley for preparing food with improved access to galley work areas comprising:
    a partially enclosed galley area having a top galley structure and a work deck in the galley area; and
    a galley insert having a housing and a top mounting element disposed on top of the housing, the galley insert being attached to the top galley structure at the top mounting element, and located above and spaced from the work deck,
    wherein the housing of the galley insert further includes a stowable front door and a slidable door mounting mechanism at a bottom of the housing, the stowable door being hingeably coupled to the door mounting mechanism, and a door support element at the bottom of the housing for receiving the door when it is stowed below the housing, and
    wherein the door support element comprises a bracket running generally perpendicularly to the front of the housing, having a lip that is generally parallel to and spaced from the bottom of the housing, and the lip extends below the stowable door when the stowable door is stowed below the housing, in which the door mounting mechanism further comprises: a rail disposed on the bottom of the housing generally perpendicularly to a front of the housing; a coupling hingeably affixed to a bottom edge of the stowable door slidably mounted to the rail; and
    the lip and the rail controls the horizontal sliding of the door.

2. The galley of claim 1, in which the galley is an aircraft galley.

3. The galley of claim 1, in which the galley area further includes a back galley structure disposed behind the housing, and the galley insert further includes a back support element disposed on a back of the housing to support the housing at the back galley structure.

4. The galley of claim 1, in which the galley area further includes a back galley structure disposed behind the housing, and the galley insert is attached to the back galley structure instead of the top galley structure.

5. The galley of claim 1, in which the top galley structure includes a partially enclosed cavity, and the galley insert is attached to a top of the partially enclosed cavity at the top mounting element.

6. The galley of claim 1, in which the galley insert comprises an apparatus selected from the group consisting of an oven, a beverage center, a refrigerator, and a freezer.

7. The galley of claim 1, in which the galley insert comprises an oven.

8. A galley for preparing food with improved access to galley work areas comprising:
- a partially enclosed cavity having a top and a bottom; and
- a galley insert having a housing and a top mounting element disposed on top of the housing, the galley insert being attached to the top of the partially enclosed cavity at the top mounting element, and located above and spaced from the bottom of the partially enclosed cavity,
- wherein the housing of the galley insert further includes a stowable front door and a slidable door mounting mechanism at a bottom of the housing, the stowable door being hingeably coupled to the door mounting mechanism, and a door support element at the bottom of the housing for receiving the door when it is stowed below the housing, and
- wherein the door support element comprises a bracket running generally perpendicularly to the front of the housing, having a lip that is generally parallel to and spaced from the bottom of the housing, and the lip extends below the stowable door when the stowable door is stowed below the housing, in which the door mounting mechanism further comprises: a rail disposed on the bottom of the housing generally perpendicularly to a front of the housing; a coupling hingeably affixed to a bottom edge of the stowable door slidably mounted to the rail; and
- the lip and the rail controls the horizontal sliding of the door.

9. The galley of claim 8, in which the galley is an aircraft galley.

10. The galley of claim 8, in which the partially enclosed cavity is disposed at a top of the galley.

11. The galley of claim 8, in which the partially enclosed cavity further includes a back surface, and the galley insert further includes a back support element disposed on a back of the housing to support the housing at the back surface of the partially enclosed cavity.

12. The galley of claim 8, in which the partially enclosed cavity further includes a back surface, and the galley insert is attached to the back surface instead of the top of the partially enclosed cavity.

13. An oven for installation and use in a partially enclosed galley work area having a top galley structure and a work deck comprising:
- an oven housing having a heating element and a top; and
- a top mounting element disposed on the top of the housing for attaching the oven to the top galley structure,
- wherein the oven housing further includes a stowable front door and a slidable door mounting mechanism at a bottom of the oven housing, the stowable door being hingeably coupled to the door mounting mechanism, and a door support element at the bottom of the housing for receiving the door when it is stowed below the housing, and
- wherein the door support element comprises a bracket running generally perpendicularly to the front of the oven housing, having a lip that is generally parallel to and spaced from the bottom of the oven housing, and the lip extends below the stowable door when the stowable door is stowed below the oven housing, in which the door mounting mechanism further comprises: a rail disposed on the bottom of the housing generally perpendicularly to a front of the housing; a coupling hingeably affixed to a bottom edge of the stowable door slidably mounted to the rail; and
- the lip and the rail controls the horizontal sliding of the door.

14. The oven of claim 13, further comprising a back support element disposed on a back of the housing for supporting the oven at a back galley structure in the galley work area.

15. The oven of claim 13, in which the oven includes a back support element disposed on a back of the housing for attaching the oven to a back galley structure in the galley work area instead of the top support element.

\* \* \* \* \*